Patented Jan. 18, 1944

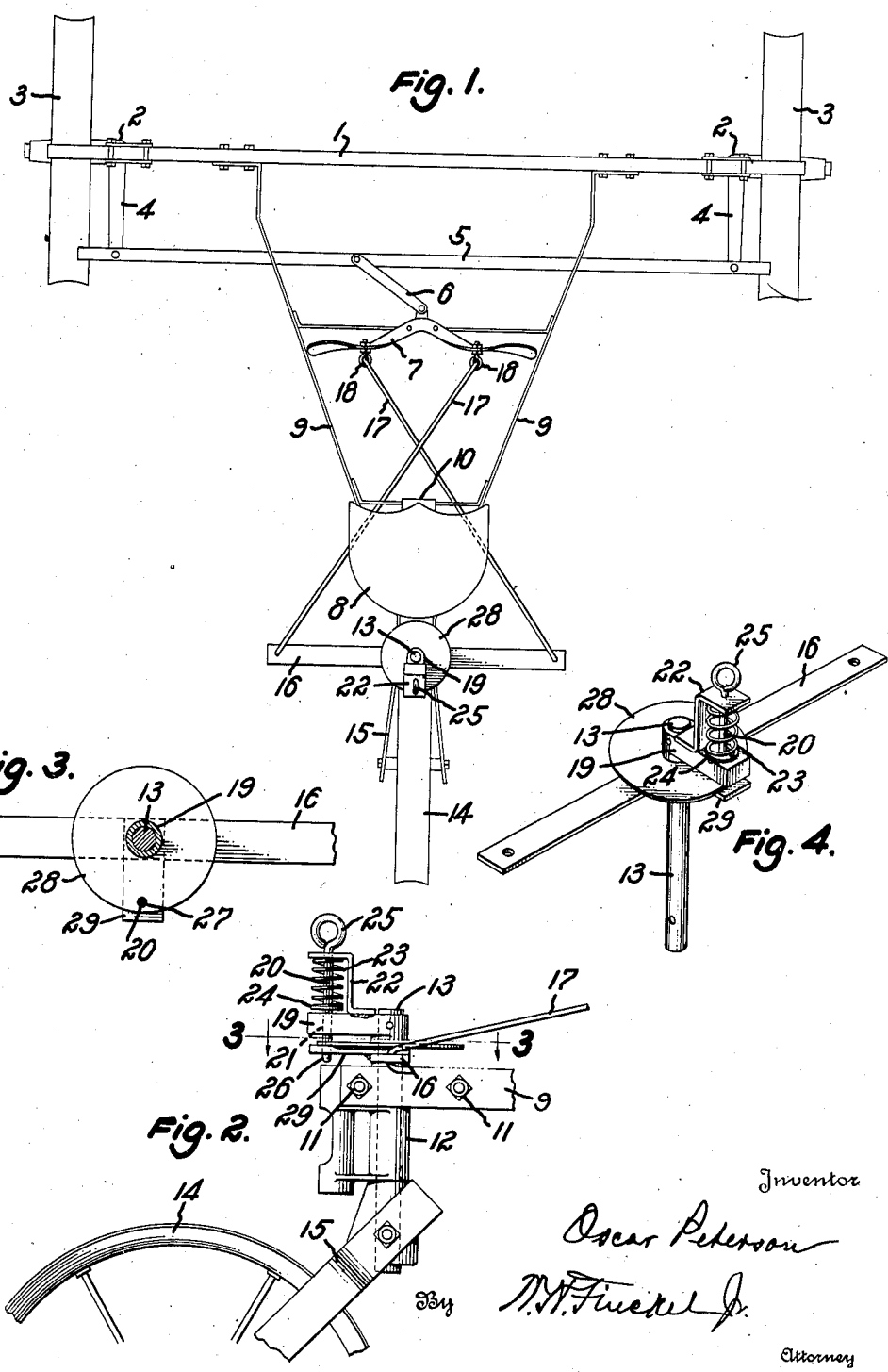

2,339,582

UNITED STATES PATENT OFFICE 2,339,582

CASTER WHEEL MEANS FOR AGRICULTURAL MACHINES

Oscar Peterson, Eden, Idaho

Application October 28, 1941, Serial No. 416,921

2 Claims. (Cl. 280—33.5)

In the operation of cultivators and other agricultural machines in which a trailing caster or "crazy" wheel is embodied, it often happens, especially upon side-hill operation, that the caster wheel will slip or swing about, thus making control of the machine difficult, and usually resulting in injury to plants in its path of travel.

The object of the invention is to provide novel means for normally steering the caster wheel in response to steering movement of the steered wheels of the machine, and whereby it may be released for abrupt turning of the machine and automaticaly restored to steered condition upon completion of the turn. Moreover, in accordance with the invention the caster wheel is steered in opposite to normal sense with relation to the steered wheels.

It is known that steering of the caster wheels of agrictultural machines in response to steered movement of the steered wheels thereof is not broadly novel. Nor is it broadly new to provide means for releasing the steering connection of the caster wheel and for restoring such connection at will.

The manner and means whereby these functions are performed in accordance with the present invention are, however, different from anything for the same purpose heretofore known, and the instrumentalities used are much simpler in construction and operation, less expensive to provide and install, and more easily adapted to agricultural machines of known types.

The invention contemplates, in a broad sense, means for steering the caster wheels of agricultural machines by connection thereof with the steering mechanism provided for the customary steered wheels of such machines, said means including arm means preferably journalled upon the pivot shaft of the caster wheel, and means releasably connecting said arm means with such pivot shaft; the releasable connecting means including a latch pin normally resiliently pressed into engagement with parts fixed respectively upon said pivot shaft and arm means to normally maintain the same predetermined fixed relation of these parts, and having provision for automatically holding the latch pin released when it is withdrawn from such engagement to thus permit necessary rotation of the pivot shaft, as when making an abrupt turn, and to permit reengagement when such rotation is completed, all as will be explained hereinafter more fully and finally claimed.

In the accompanying drawing illustrating the invention, in the several figures of which like parts are similarly designated, Fig. 1 is a schematic top plan view illustrating certain selected parts, including the steering mechanism, of an agricultural machine of conventional type with the device of the invention applied thereto.

Fig. 2 is an enlarged fragmentary side elevation of the caster wheel provided with the device of the invention.

Fig. 3 is a sectional plan view taken in the plane of line 3—3, Fig. 2, and

Fig. 4 is a perspective view of novel parts of the device of the invention.

As schematically illustrated in Fig. 1, the frame member 1 of the machine which, as illustrated, is a conventional type of cultivator, carries upon suitable pivot bearings 2 the front wheels 3 having steering arms 4 connected with the tie rod 5 to which steering motion is imparted through a link 6 from the pedal lever 7 controlled by the operator from his position in the seat 8. The frame members 9 which extend rearwardly from the member 1 carry the seat support 10 and are affixed as by bolts 11 to the bearing member 12 in which is journalled the pivot shaft 13 of the caster or "crazy" wheel 14 which has its bearings in a fork 15 affixed to and turning with the shaft 13, all in the customary manner.

As hereinbefore indicated, the caster wheel, when thus conventionally mounted, is merely a trailing wheel serving to support the rear end of the machine and free to swing upon its pivot bearing to follow the steered course of the machine and, obviously, in working upon a side-hill field it may swing out of line and damage adjacent plants, at the same time making it possible for the machine to slip sidewise and adding to the operator's difficulty in following the rows.

By providing for steering of the caster wheel 14 in response to steering movement of the wheels 3 but in opposite to normal sense with relation thereto, these difficulties are, in a practical sense, overcome, and the operation and control of the machine greatly enhanced. However, in order to be fully adaptable, the means for steering the caster wheel must be so devised that it is possible for the operator to make an abrupt turn at the end of each row so that the machine may be brought into reversed position for travel back on the next adjacent row.

The mechanism of the invention, whereby the proper steering and control of the caster wheel may be accomplished to meet the ordinary conditions of use, includes arm means 16 freely journalled upon the pivot shaft 13 of the caster wheel and having its ends connected with the pedal lever 7 by crossed links 17 fastened to the pedal lever preferably by eye bolts 18. Either integral with or applied to the upper end of the pivot shaft 13, and turning therewith, is a lever arm 19 carrying a latch pin 20 axially slidable in a bore 21 in the lever arm 19 and in a bracket affixed to the lever arm. This latch pin is normally resiliently depressed by a spring 23 bearing against a washer 24 located upon the pin, and against the bracket 22, and it is provided with a hand grip or eye 25 within easy reach of the operator from his position in the seat 8. The lower end 26 of the latch pin normally passes through a hole 27 in a bearing plate or disc 28 welded or otherwise rigidly connected with the arm means 16, preferably through a reinforcing member 29 fixed to the arm means and having a latch pin receiving hole registering with the hole 27 in the disc 28.

It will be apparent that when the latch pin 20 is engaged with the parts 28 and 29, as shown in Fig. 2, the caster wheel will be connected for steering in response to steering of the steered wheels 3 through the medium of the arm means 16, crossed links 17 and pedal lever 7, and thus the operator will have adequate control over the direction of travel of the machine.

For example, assuming that the machine is working upon a side-hill sloping downwardly to the right of Fig. 1, progress straight along the rows will be maintained by steering the wheels 3 slightly up hill (to the left), the caster wheel being similarly steered by virtue of the crossed links 17. Thus there will be no tendency for the rear end of the machine to slip down hill or for the caster wheel to swing free.

When the end of a row is reached and it is desired to make an abrupt turn, the operator withdraws the latch pin 20 from engagement with the registering holes in the disc 28 and reinforcing member 29 and, as the machine is turned more or less about the caster wheel as a pivot, the operator may release the latch pin and permit its end 26 to ride upon the disc 28 until the caster wheel and disc are again in such relation that the latch pin may, under the influence of the spring 23, again enter the registering holes and lock the parts together in steering condition.

It will be noted that provision of the disc 28 upon which the end 26 of the latch pin may ride during the making of a turn relieves the operator of the need for continuing to hold the pin withdrawn and thus enables him to devote his full attention to the making of the turn. Also, when the turn has been completed and return travel on an adjacent row commenced, thus accomplishing a full relative rotation of the parts 19 and 28, the pin will automatically lock the caster wheel in steered condition.

The construction and assembly of the parts make the device capable of application cheaply and easily to agricultural machines of many known types now in service and without the aid of a skilled mechanic.

Various changes and modifications are considered to be within the spirit of the invention and the scope of the following claims.

What I claim is:

1. In caster wheel means for agricultural machines, means providing for steering of the caster wheel in response to steering movement of the steered wheels of the machine, including a member movable with the caster wheel, a member movable in response to steering movement of the steered wheels, and means for interengaging said members, said interengaging means including a latch carried by one member, and a plate carried by the other member and having a single latch-engaging means, said latch being provided with means whereby it may be manually disengaged from the latch-engaging means and thereafter upon relative rotation of said movable members released for contact with said plate, said plate then serving as an abutment upon which said latch may ride during continued movement of said movable members throughout one complete revolution of one of same.

2. In caster wheel means for agricultural machines, means providing for steering of the caster wheel in response to steering movement of the steered wheels of the machine, including a lever arm rigid with the pivot shaft of the caster wheel, arm means rotatively journalled with respect to said pivot shaft and connected with the steering means of the steered wheels, and means providing a releasable connection between said lever arm and arm means, including a latch pin carried by said lever arm and a plate carried by said arm means, said plate provided with a single opening to receive said latch pin when the pin and opening are in register, said latch pin being provided with means whereby it may be manually withdrawn from said opening and thereafter upon relative rotation of said arm and arm means released for contact with said plate, said plate then serving as an abutment upon which said latch pin may ride to maintain the lever arm and arm means disconnected when the pin and opening are out of register, whereby said steered wheels and caster wheel may be interconnected for steering movement with the caster wheel in only one position relatively to the said arm means.

OSCAR PETERSON.